US00RE47610E

(19) United States
(12) Reissued Patent
Maher et al.

(10) Patent Number: US RE47,610 E
(45) Date of Reissued Patent: Sep. 17, 2019

(54) POWER MANAGEMENT WITH OVER VOLTAGE PROTECTION

(71) Applicant: Fairchild Semiconductor Corporation, Sunnyvale, CA (US)

(72) Inventors: Gregory A. Maher, Cape Elizabeth, ME (US); Myron J. Miske, Newfields, NH (US)

(73) Assignee: Fairchild Semiconductor Corporation, Phoenix, AZ (US)

(21) Appl. No.: 15/265,742

(22) Filed: Sep. 14, 2016

Related U.S. Patent Documents

Reissue of:
(64) Patent No.: 8,836,166
Issued: Sep. 16, 2014
Appl. No.: 13/274,654
Filed: Oct. 17, 2011

U.S. Applications:
(60) Provisional application No. 61/393,795, filed on Oct. 15, 2010.

(51) Int. Cl.
*H02H 1/06* (2006.01)
*H02H 7/20* (2006.01)
(Continued)

(52) U.S. Cl.
CPC ..... *H02H 1/06* (2013.01); *G06F 1/263* (2013.01); *G06F 1/30* (2013.01); *H02H 7/20* (2013.01);
(Continued)

(58) Field of Classification Search
CPC ..... G06F 1/263; G06F 1/30; G06F 1/305; H02H 1/06; H02H 7/20; H02H 9/04;
(Continued)

(56) References Cited

U.S. PATENT DOCUMENTS 3,483,393 A * 12/1969 Gutzmer et al. ..... H02J 9/061 307/66
4,037,158 A * 7/1977 Eastmond ..... 455/69
(Continued)

FOREIGN PATENT DOCUMENTS

CN 101141077 A 3/2008
CN 102591439 A 7/2012
(Continued)

OTHER PUBLICATIONS

"Chinese Application Serial No. 201110314540.3, Office Action dated May 16, 2014", 10 pgs.
(Continued)

*Primary Examiner* — Peter C English
(74) *Attorney, Agent, or Firm* — Brake Hughes Bellermann LLP

(57) ABSTRACT

This document discusses, among other things, systems and methods to provide an internal supply rail with over voltage protection using a host power source, an external power source, and a switch configured to receive indications of host and external power source validity. In an example, the switch can be configured to provide the internal supply rail using the host power source when the indication of host power source validity indicates a valid host power source and the external power source when the indication of host power source validity indicates an invalid host power source and the indication of external power source validity indicates a valid external power source.

20 Claims, 6 Drawing Sheets

Amended

(51) Int. Cl.

| | |
|---|---|
| ***H02H 9/04*** | (2006.01) |
| ***G06F 1/26*** | (2006.01) |
| ***G06F 1/30*** | (2006.01) |
| ***H02J 9/06*** | (2006.01) |

(52) U.S. Cl.
CPC ..... *H02H 9/04* (2013.01); *H02J 9/061* (2013.01); *H02J 2009/068* (2013.01); *Y10T 307/50* (2015.04); *Y10T 307/696* (2015.04)

(58) Field of Classification Search
CPC ..... H02H 9/041; H02H 9/046; H02H 3/20; H02H 3/207; H02H 3/24; H02H 3/247; H02J 9/06; H02J 9/061; H02J 2009/068; Y10T 307/696; Y10T 307/615; Y10T 307/50
See application file for complete search history.

(56) References Cited

U.S. PATENT DOCUMENTS

| | | | | |
|---|---|---|---|---|
| 5,387,820 | A * | 2/1995 | Imagawa | G05F 1/577 307/31 |
| 7,528,582 | B1 * | 5/2009 | Ferguson | H02J 7/0021 320/128 |
| 7,821,233 | B2 * | 10/2010 | Nate et al. | 320/134 |
| 8,203,815 | B2 * | 6/2012 | Kilroy et al. | 361/91.1 |
| 8,836,166 | B2 | 9/2014 | Maher et al. | |
| 2001/0017485 | A1 * | 8/2001 | Yoo | H02J 9/06 307/66 |
| 2003/0006650 | A1 * | 1/2003 | Tang et al. | 307/43 |
| 2004/0017110 | A1 * | 1/2004 | Yim | H02J 9/062 307/23 |
| 2005/0285190 | A1 * | 12/2005 | You et al. | H02J 9/061 257/341 |
| 2006/0259840 | A1 * | 11/2006 | Abadeer et al. | 714/733 |
| 2007/0263420 | A1 | 11/2007 | Nate et al. | |
| 2009/0206671 | A1 * | 8/2009 | Chang | 307/65 |
| 2009/0224738 | A1 * | 9/2009 | Peto | 323/282 |
| 2010/0270862 | A1 * | 10/2010 | Miyanaga et al. | H01M 10/44 307/66 |
| 2012/0126625 | A1 | 5/2012 | Maher et al. | |

FOREIGN PATENT DOCUMENTS

| | | | | |
|---|---|---|---|---|
| JP | 2009268184 | A | 11/2009 | |
| JP | 2010038132 | A | 2/2010 | |
| JP | 4539433 | B2 | 9/2010 | |
| KR | 19930022722 | A | 11/1993 | |
| KR | 20100106854 | A | 10/2010 | |
| WO | WO 2009072281 | A1 * | 6/2009 | H01M 10/44 |

OTHER PUBLICATIONS

First Office Action for Korean Application No. 10-2011-0106084, dated Feb. 7, 2018, 3 pages.
Notice of Allowance for Korean Application No. 10-2011-0106084, dated Aug. 28, 2018, 3 pages.
U.S. Appl. No. 13/274,654, Corrected Notice of Allowability, dated Aug. 13, 2014, 2 pages.
U.S. Appl. No. 13/274,654, Non-Final Office Action dated Sep. 5, 2013, 18 pages.
U.S. Appl. No. 13/274,654, Notice of Allowance, dated Mar. 20, 2014, 10 pages.
U.S. Appl. No. 13/274,054, Response filed Jan. 6, 2014, to Non-Final Office Action dated Sep. 5, 2013, 19 pages.
Chinese Application No. 201110314540.3, Response filed Nov. 27, 2014, to First Office Action dated May 16, 2014, with English language claims, 11 pages.
Chinese Application No. 201110314540.3, Second Office Action, dated Mar. 20, 2015, 13 pages.
Chinese Application No. 201110314540.3, Third Office Action, dated Sep. 2, 2015, 5 pages.
Chinese Application No. 201110314540.3, Response filed Jun. 3, 2015, to Second Office Action dated Mar. 20, 2015, with English language claims, 16 pages.
Chinese Application No. 201110314540.3, Response filed Nov. 16, 2015, to Third Office Action dated Sep. 2, 2015, with English language claims, 35 pages.

* cited by examiner

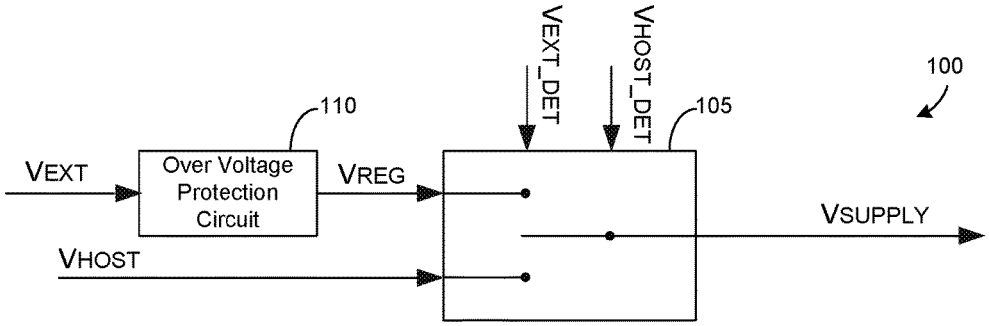
FIG. 1 Amended
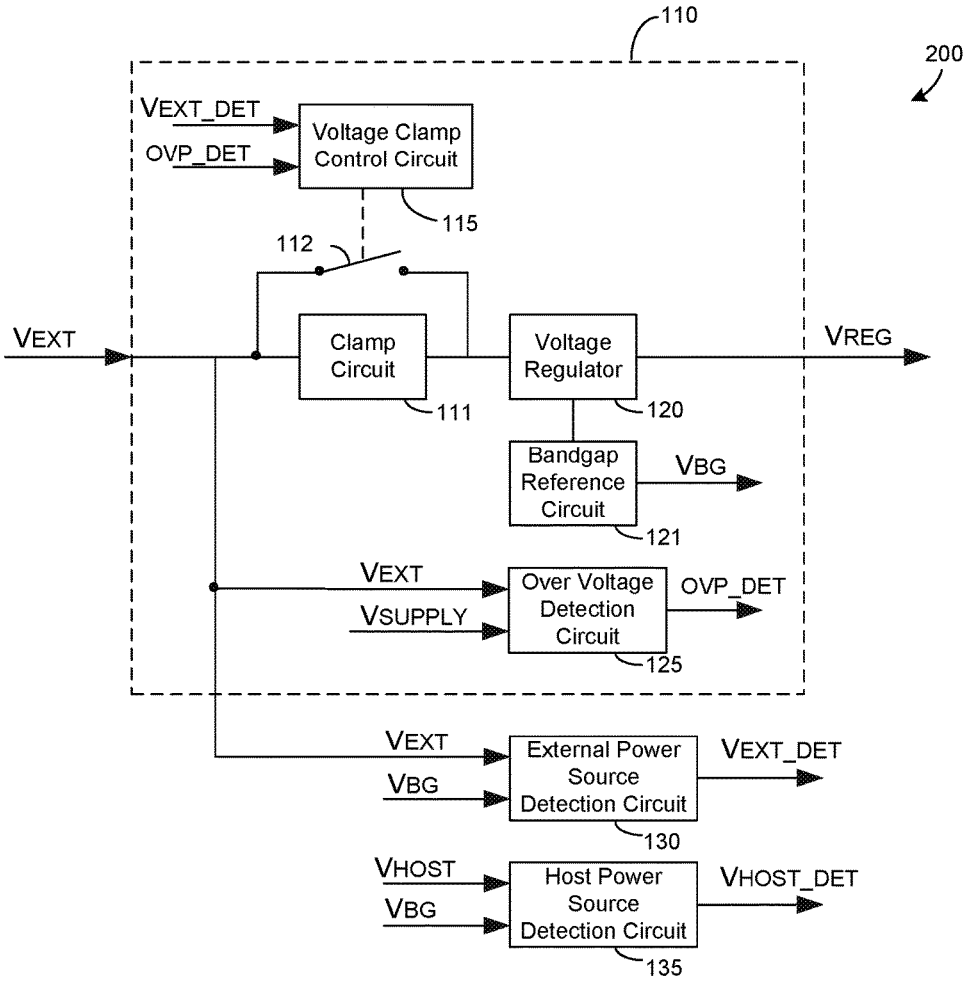
FIG. 2 Amended

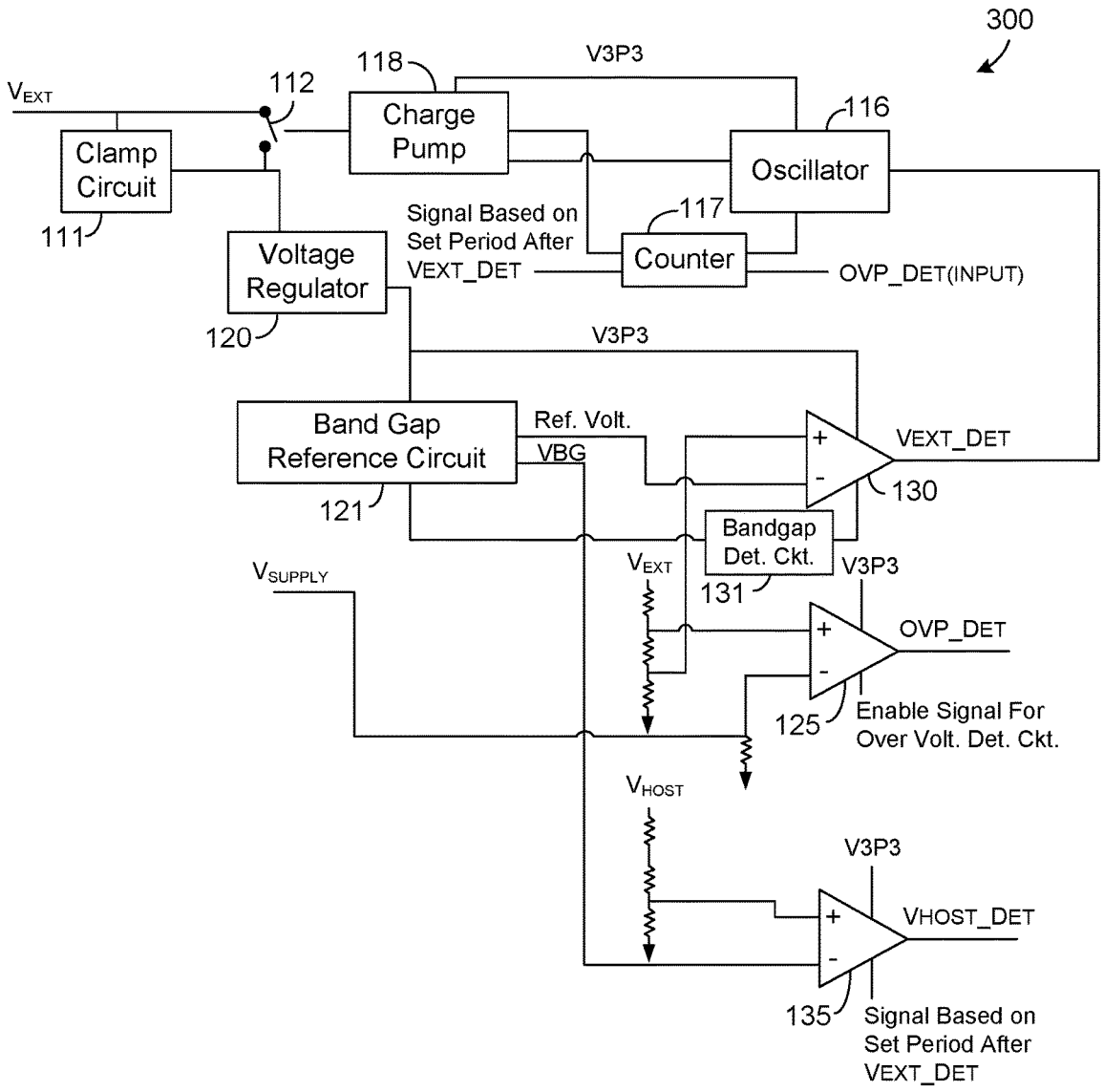
FIG.3 Amended

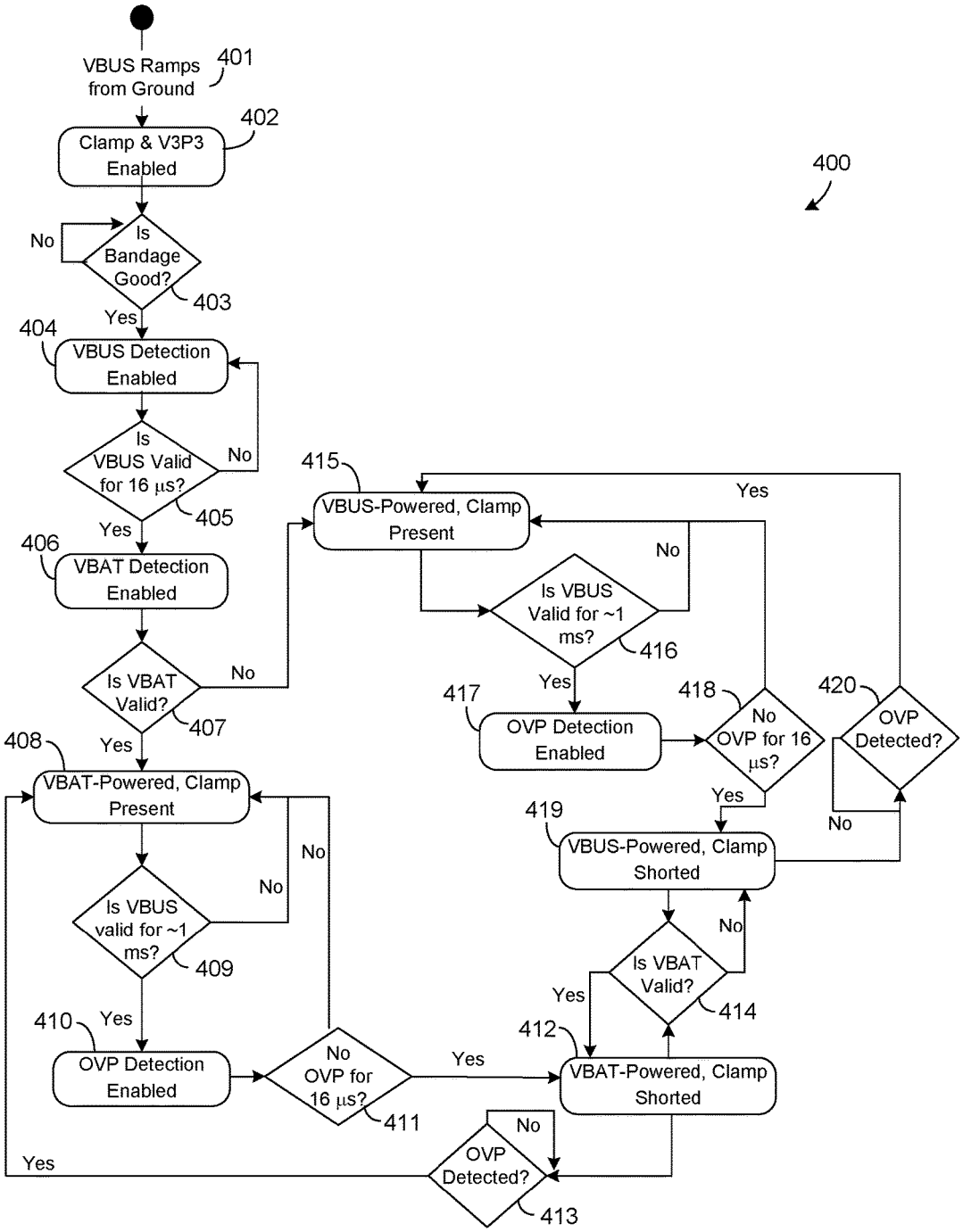
FIG.4 Amended

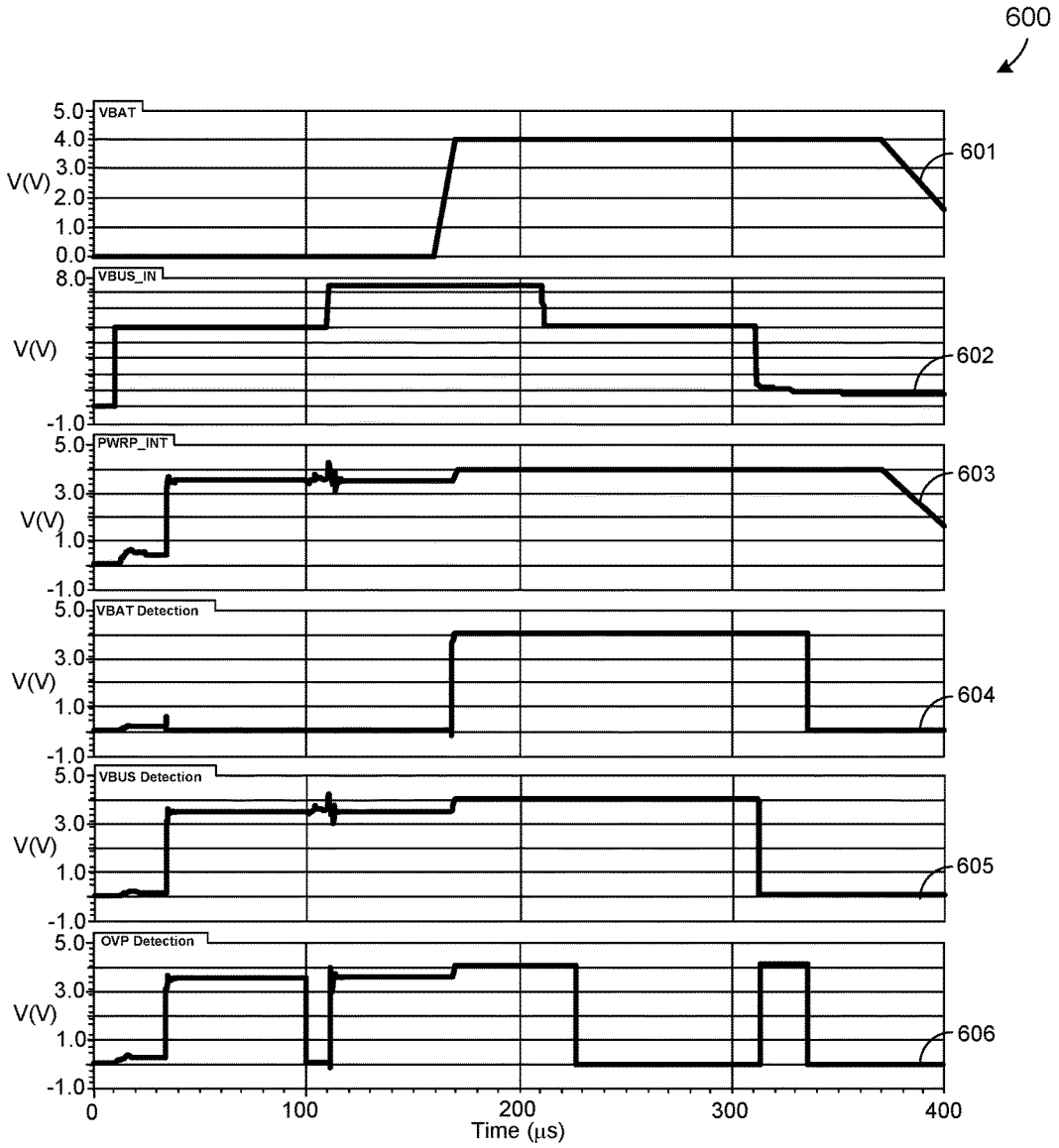
FIG. 6 Amended

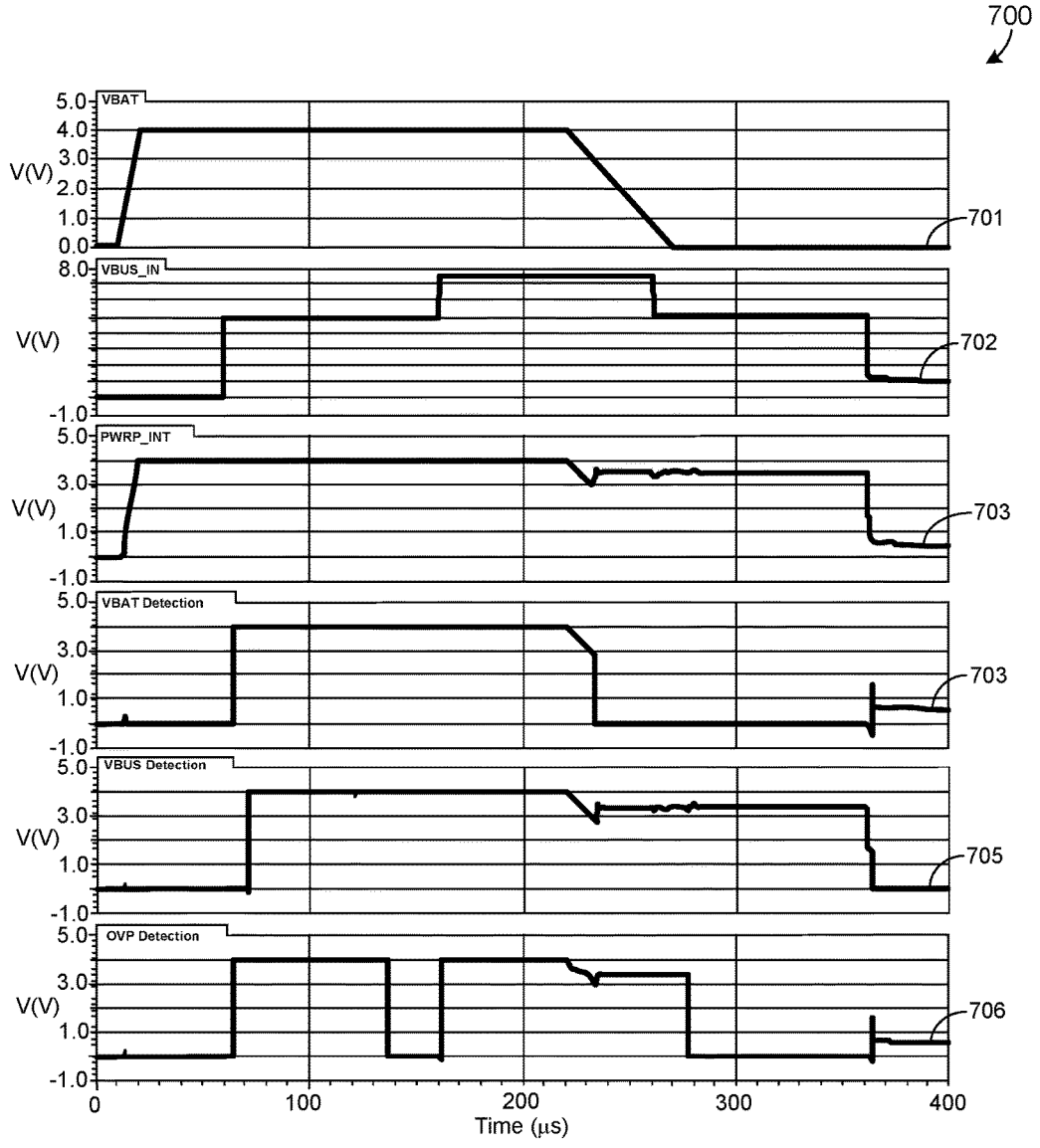
FIG. 7 Amended

POWER MANAGEMENT WITH OVER VOLTAGE PROTECTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM OF PRIORITY

This application claims the benefit of priority under 35 U.S.C. § 119(e) of Gregory A. Maher et al. U.S. Provisional Patent Application Ser. No. 61/393,795, entitled "POWER MANAGEMENT WITH OVER VOLTAGE PROTECTION," filed on Oct. 15, 2010, which is incorporated by reference herein in its entirety.

BACKGROUND

Many portable devices require external ports to provide various functions. Increasing size pressures (e.g., decreasing the overall sizes of the portable devices) are forcing external ports to accommodate an increasing number of functions. For example, chips or circuits that interface with these ports can be required to, among other things, manage or provide charging of the portable device, data communication, multimedia interface, factory test capabilities, etc.

In addition to added functionality, these chips or circuits can be required to manage over-voltage conditions (e.g., where two external sources may short to generate high voltages, such as upwards of 28 volts, etc.) as well as no-battery conditions (e.g., conditions where there is no-battery present in the device, such as during factory testing).

Overview

This document discusses, among other things, systems and methods to provide an internal supply rail with over voltage protection using a host power source, an external power source, and a switch configured to receive indications of host and external power source validity. In an example, the switch can be configured to provide the internal supply rail using the host power source when the indication of host power source validity indicates a valid host power source and the external power source when the indication of host power source validity indicates an invalid host power source and the indication of external power source validity indicates a valid external power source.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 1-3 illustrate generally example power management circuits.

FIG. 4 illustrates generally an example method including selecting either an external power source ($V_{EXT}$) or a host power source ($V_{HOST}$) as a source for an internal supply rail ($V_{SUPPLY}$).

FIGS. 6-7 illustrate generally example power sequences illustrating waveforms for the inner and outer power sequences illustrated in the example of FIG. 5.

DETAILED DESCRIPTION

Figure 5:
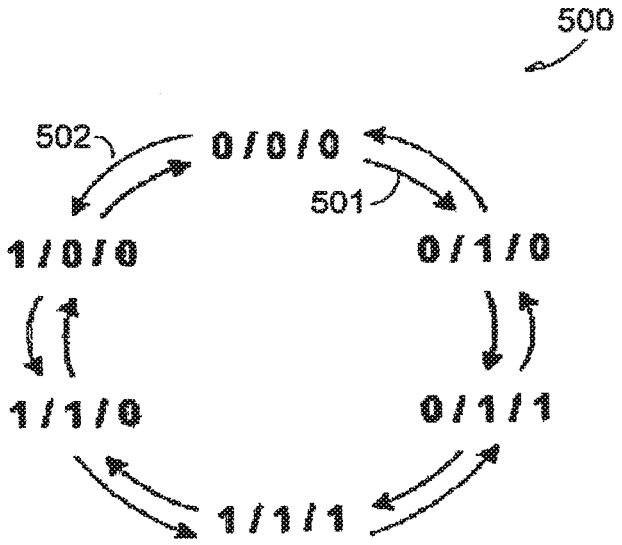
FIG. 5 illustrates generally example transitions between a host power source ($V_{HOST}$), an external power source ($V_{EXT}$), and an over voltage protection (OVP) condition for inner and outer power sequences.

The present inventor has recognized, among other things, a circuit configured to provide an internal supply rail that switches between power from a host power source and power from an external power source. In an example, the quality of the external source (e.g., stability, voltage level, etc.) can be checked before switching the internal supply rail from the host power source to the external source, in certain examples, eliminating the possibility of triggering internal reset circuitry or exposing the internal circuitry to high voltages. Further, in an example, the circuit can enable a chip to operate during over-voltage conditions or dead or no-battery conditions at the same time, or separately, and, in certain examples, can detect multiple standards and locations of electrostatic discharge (ESD) diodes or other devices in a single, reusable block.

In an example, the host power source (e.g., a battery) can be configured as the default power supply regardless of whether the host power source has a higher voltage than the external source (e.g., a USB bus voltage). In certain examples, the host power source can be preferred as long as the voltage of the host power source exceeds a threshold (e.g., 3.1V, etc.). In an example, when the host power source is invalid (e.g., below the threshold, when the battery is absent, etc.), and an external source has been received and is valid, the internal supply rail can be established using the external source. However, to protect internal circuitry from over voltage conditions, the external power source can be monitored for an over voltage condition, and the external power source can be clamped if the over voltage condition exists, or at startup or detection of the eternal power source to ensure that an over voltage condition does not exist.

FIG. 1 illustrates generally an example power management circuit 100, such as for an electronic device, the power management circuit 100 including a switch 105 and an over voltage protection circuit 110. In an example, the over voltage protection circuit 110 can be configured to receive a voltage from an external power source ($V_{EXT}$) (e.g., voltage from a universal serial bus (USB) or other bus or external voltage source, etc.) and to provide a regulated voltage ($V_{REG}$) (e.g., a 3.3V regulated voltage, etc.). The switch 105 can be configured to receive power from multiple sources, for example, including the regulated voltage ($V_{REG}$) or voltage from a host power source ($V_{HOST}$) (e.g., a battery or other internal or host power source, etc.), etc., and can be configured to provide an internal supply rail ($V_{SUPPLY}$) using the received power.

In an example, the switch 105 can be configured to receive indications of host power source and external power source validity, $V_{HOST_DET}$ and $V_{EXT_DET}$, respectively, and in certain examples, can provide the internal supply rail ($V_{SUPPLY}$) using:

(1) voltage front the host power source ($V_{HOST}$) when the indication of host power source validity ($V_{HOST_DET}$) indicates a valid host power source (e.g., when $V_{HOST_DET}$ is high, etc.); and (2) voltage from the external power source ($V_{EXT}$)(e.g., the regulated voltage ($V_{REG}$), etc.) when the indication of host power source validity ($V_{HOST_{DET}}$) indicates an invalid host power source (e.g., when $V_{HOST_DET}$ is low, etc.) and the indication of external power source validity ($V_{EXT_DET}$) indicates a valid external power source (when $V_{EXT_DET}$ is high, etc.).

FIG. 2 illustrates generally an example power management circuit 200 including an over voltage protection circuit 110, an external power source detection circuit 130, and a host power source detection circuit 135. In an example, the over voltage protection circuit 110 can include a clamp circuit 111 (e.g., a 4V clamp circuit, etc.), a voltage regulator 120 configured to provide a regulated voltage ($V_{REG}$) (e.g., 3.3V, etc.), a bandgap reference circuit 121 configured to provide a bandgap voltage reference ($V_{BG}$) (e.g., 1.2V, etc.), an over voltage detection circuit 125, and a voltage clamp switch 112 (e.g. a transistor, such as a MOSFET, etc.).

In an example, the over voltage detection circuit 125 can be configured to receive the voltage from the external power source ($V_{EXT}$) and the internal supply rail ($V_{SUPPLY}$) and can provide an indication of an over voltage condition ($_{OVP_DET}$), for example, if the voltage from the external power source ($V_{EXT}$) exceeds the internal supply rail ($V_{SUPPLY}$) by a threshold. In an example, the threshold can be set using a voltage divider, and the over voltage detection circuit 125 can include a comparator.

In an example, the voltage clamp switch 112 can be controlled using a voltage clamp control circuit 115. The over voltage clamp control circuit 115 can be configured to receive an indication of a detected over voltage condition ($_{OVP_DET}$) or external power source validity ($V_{EXT_DET}$), and can selectively open or close the voltage clamp switch 112 using the received indications.

In an example, the clamp circuit 111 can be configured to clamp the voltage from the external power source ($V_{EXT}$) at a specified amount (e.g., 4V, etc.) to protect one or more other components of the electronic device. Further, in certain examples, the clamp circuit 111 can be configured to clamp the voltage from the external power source ($V_{EXT}$) for a specified time period when the indication of the external power source validity ($V_{EXT_DET}$) is first received, for example, to ensure that no over voltage condition exists.

In an example, the external power source detection circuit 130 can be configured to validate the voltage from the external power source ($V_{EXT}$) and to provide the indication of external power source validity ($V_{EXT_DET}$), for example, by comparing the voltage from the external power source ($V_{EXT}$) or a representation of the voltage from the external power source ($V_{EXT}$) (e.g., using a voltage divider, etc.) to a reference, such as $V_{BG}$, etc. In other examples, to be valid, $V_{EXT}$ must remain above the reference for a specified period of time (e.g., 16 [us] $\mu s$, etc.).

In an example, the host power source detection circuit 135 can be configured to validate the voltage from the host power source ($V_{HOST}$) and to provide the indication of host power source validity ($V_{HOST_DET}$), in certain examples, similar to that described above for the external power source detection circuit 130.

FIG. 3 illustrates generally an example power management circuit 300 including a clamp circuit 111, a voltage clamp switch 112, voltage clamp control circuitry, a voltage regulator 120, a bandgap reference circuit 121, an over voltage detection circuit 125, an external power source detection circuit 130, and a host power source detection circuit 135.

In an example, the voltage clamp control circuitry can include an oscillator 116, a counter 117, and a charge pump 118 (e.g., a doubling charge pump). In an example, the oscillator 116 can be configured to receive a regulated voltage ($V_{REG}$) (e.g., here, 3.3V, or V3P3) and an indication of external power source validity ($V_{EXT_DET}$). In an example, when the indication of external power source validity ($V_{EXT_DET}$) indicates a valid external power source ($V_{EXT}$), the oscillator 116 can be enabled, the counter 117 can begin counting for a specified time period, and the charge pump 118 can ramp up. In an example, the charge pump 118 can control the voltage clamp switch 112 and determine when the clamp circuit 111 will be shorted.

In another example, the counter 117 can be configured to receive an indication of an over voltage condition ($_{OVP_DET}$), and, if the over voltage condition exists, the charge pump 118 can be configured to open the voltage clamp switch 112, clamping the external power source to protect from the over voltage condition. In an example, the voltage from external power source ($V_{EXT}$) can be clamped even if the voltage from the host power source ($V_{HOST}$) is being used to provide the inner supply rail ($V_{SUPPLY}$).

In an example, the over voltage detection circuit 125, the external power source detection circuit 130, and the host power source detection circuit 135 can include comparators configured to compare specified voltages to different references to detect valid voltage sources or an over voltage condition. In an example, a bandgap detection circuit 131 can be configured to enable the external power source detection circuit 130 when a valid bandgap voltage reference ($V_{BG}$) is detected.

In other examples, the power management circuit 300 can include a power select switch (e.g., a 2-to-1 switch), a digital core (e.g., driven by an internal supply), and one or more analog reference circuits (e.g., driven by the internal supply) or voltage dividers (e.g., to provide various reference voltages).

In an example, the voltage from the host power source ($V_{HOST}$) can be the default power supply. As the voltage from the external power source ($V_{EXT}$) ramps from ground, the clamp circuit 111 and one or more of the regulators can be enabled, and a regulated voltage ($V_{REG}$) can be provided. In certain examples, the clamp circuit 111 and the one or more regulators can be autonomous.

In an example, the bandgap reference circuit 121 can be enabled by the ramp of the regulated voltage supply. When the bandgap voltage ($V_{BG}$) is determined to be "good", or valid, one or more of the comparators can be enabled to detect that the voltage of the external power source ($V_{EXT}$) is high enough for operation (e.g., above 3.1V, etc.). In other examples, one or more other checks can be made, such that the voltage of the external power source ($V_{EXT}$) is stable, etc. When the voltage of the external power source ($V_{EXT}$) is determined to be valid, the voltage of the host power source ($V_{HOST}$) can be detected, for example, following one or more clock cycles (e.g., a predetermined number of clock cycles, a programmable number of clock cycles, etc.), such as determined by the oscillator 116.

In an example, if the voltage of the host power source ($V_{HOST}$) is detected and valid, then the internal supply rail ($V_{SUPPLY}$) can be powered by the voltage of the host power source ($V_{HOST}$). If the voltage of the host power source ($V_{HOST}$) is not detected or is invalid, then the internal supply rail ($V_{SUPPLY}$) can be powered by the regulated voltage ($V_{REG}$). In certain examples, the clamp circuit 111 is a temporary power supply and is not intended to provide enough power for full functionality. In an example, the clamp circuit 111 can be shorted, for example, using the switch 112, providing power directly from the external voltage source.

In either case, the power management circuit 300 can wait for a signal (e.g., a logic signal, such as an enable over voltage protection (OVP) detection signal) before determining that the internal circuitry has enough voltage to function. In an example, the signal can be provided from the digital core (e.g., supplied by the internal supply and based off of an external power source ($V_{EXT}$) valid signal).

In an example, once the external power source ($V_{EXT}$) valid signal is received, the over voltage protection circuit 110 can actively monitor for an over-voltage condition. If the condition does not exist, the clamp circuit 111 can be shorted out and the internal circuitry may operate with full functionality.

In other examples, the external power source ($V_{EXT}$) can be the default power supply, or the system 300 can be configured to provide a programmable default power supply as either the external power source ($V_{EXT}$) or the host power source ($V_{HOST}$).

FIG. 4 illustrates generally an example method 400 including selecting either an external power source ($V_{EXT}$) or a host power source ($V_{HOST}$) as a source for an internal supply rail ($V_{SUPPLY}$). In the example of FIG. 4, the external power source ($V_{EXT}$) can include a bus voltage ($V_{BUS}$), the regulated voltage ($V_{REG}$) can include a 3.3V regulated voltage (V3P3), and the host power source ($V_{HOST}$) can include a battery source ($V_{BAT}$).

At 401, $V_{BUS}$ can ramp from ground, and at 402, $V_{BUS}$ can be clamped and a voltage regulator can be enabled. At 403, bandgap validity is determined. If the bandgap is invalid, process can return to 403. If the bandgap is valid, then, at 404, $V_{BUS}$ detection is enabled to determine external power source validity. At 405, if $V_{BUS}$ is valid for a set period of time (e.g., 16 [us] *μs*, etc.), then, at 406, battery source validity is [determined] *enabled*.

At 407, $V_{BAT}$ validity is determined. If $V_{BAT}$ is valid, then, at 408, the internal supply rail ($V_{SUPPLY}$) is powered by $V_{BAT}$, and $V_{BUS}$ is clamped. If VBAT is invalid, then, at 415, the internal supply rail ($V_{SUPPLY}$) can be powered by $V_{BUS}$, and the clamp can be applied.

At 409, if $V_{BUS}$ is valid for a time period (e.g., approximately 1 ms, etc.), then, at 410, over voltage detection is enabled. At 409, if $V_{BUS}$ is not valid for the time period (e.g., approximately 1 ms, etc.), process flow returns to 408, the internal supply rail ($V_{SUPPLY}$) can remain powered by $V_{BAT}$, and $V_{BUS}$ can remain clamped.

At 411, if an over voltage protection condition is detected within a selected time period (e.g., 16 [us] *μs*), then process flow can return to 408, the internal supply rail ($V_{SUPPLY}$) can remain powered by $V_{BAT}$, and $V_{BUS}$ can remain clamped. At 411, if the over voltage condition was not detected within the selected time period (e.g., 16 [us] *μs*), then, at 412, the internal supply rail ($V_{SUPPLY}$) can remain powered by $V_{BAT}$, and the $V_{BUS}$ clamp can be removed or shorted.

At 413, an over voltage protection condition on $V_{BUS}$ is detected. If an over voltage protection condition is detected, process flow can return to 408 and a clamp is applied. If an over voltage condition is not detected, the clamp can remain shorted, and the over voltage protection condition on $V_{BUS}$ can continue to be monitored.

[At 414, if $V_{BAT}$ does not remain valid, then, at 419, the internal supply rail ($V_{SUPPLY}$) can be powered by $V_{BUS}$, and the clamp can be shorted.]

At 414, $V_{BAT}$ validity is determined. If $V_{BAT}$ is valid, process flow can return to 412, the internal supply rail ($V_{SUPPLY}$) is powered by $V_{BAT}$, and the clamp can remain shorted. If $V_{BAT}$ is invalid, then, at 419, the internal supply rail ($V_{SUPPLY}$) can be powered by $V_{BUS}$, and the clamp can remain shorted.

At 415, the internal supply rail ($V_{SUPPLY}$) can be powered by $V_{BUS}$, and the clamp can be applied. At 416, if $V_{BUS}$ is valid for a selected time period (e.g., 1 ms, etc.), then, at 417, overvoltage detection is enabled. At 416, if $V_{BUS}$ is not valid for the selected time period (e.g., 1 ms, etc.), then process flow can return to 415.

At 418, if an overvoltage protection condition is not detected within a selected time period (e.g., 16 [us] *μs*), then, at 419, the internal supply rail ($V_{SUPPLY}$) can be powered by $V_{BUS}$, and the clamp can be shorted. At 418, if an over voltage protection condition is detected within the selected time period (e.g., 16 [us] *μs*), then process flow can return to 415.

At 420, an over voltage protection condition on $V_{BUS}$ is detected. If an over voltage protection condition is detected, process flow can return to 415 and a clamp is applied. If an over voltage condition is not detected, the clamp can remain shorted, and the over voltage protection condition on $V_{BUS}$ can continue to be monitored.

In other examples, one or more other process steps can be used. In an example, if $V_{BAT}$ is valid, the internal supply rail ($V_{SUPPLY}$) can be powered by $V_{BAT}$.

FIG. 5 illustrates generally an example state diagram 500 illustrating transitions between a host power source ($V_{BAT}$), an external power source ($V_{BUS}$), and an over voltage protection (OVP) condition for inner and outer power sequences, 501, 502. For example, "0/0/0" refers to $V_{BAT}$=0/$V_{BUS}$=0/OVP=0, "0/1/0" refers to $V_{BAT}$=0/$V_{BUS}$=1/OVP=0, etc.

FIG. 6 illustrates generally an example power sequence 600 illustrating waveforms for the inner power sequence 501 illustrated in the example of FIG. 5, including a host power source ($V_{BAT}$) waveform 601, an external power source ($V_{BUS}$) waveform 602, an internal supply rail ($_{PWRP_INT}$) 603, an indication of host power source validity ($V_{BAT_DET}$) 604, an indication of external power source validity ($V_{BUS_DET}$) 605, and an indication of an over voltage condition ($_{OVP_DET}$) 606.

FIG. 7 illustrates generally an example power sequence 700 illustrating waveforms for the outer power sequence 502 illustrated in the example of FIG. 5, including a host power source ($V_{BAT}$) waveform 701, an external power source ($V_{BUS}$) waveform 702, an internal supply rail ($_{PWRP_INT}$) 703, an indication of host power source validity ($V_{BAT_DET}$) 704, an indication of external power source validity ($V_{BUS_{DET}}$) 705, and an indication of an over voltage condition ($_{OVP_{DET}}$) 706.

ADDITIONAL, NOTES AND EXAMPLES

In an example, one or more of the circuits described herein can be utilized on [MUS] products with charger FETs, on one or more other devices optionally receiving one or more of a host power source ($V_{HOST}$) or an external power source ($V_{EXT}$), or on products using a charging accessory port, such as a USB port.

In Example 1, a power management circuit includes a switch configured to receive a host power source (e.g., a battery voltage, etc.), an external power source (e.g., an external bus voltage, such as a USB voltage, etc.), an indication of host power source validity, and an indication of external power source validity, wherein the switch is configured to provide an internal supply rail using:

(1) the host power source when the indication of host power source validity indicates a valid host power source; and (2) the external power source when the indication of host power source validity indicates an invalid host power source and the indication of external power source validity indicates a valid external power source.

In an example, the power management circuit optionally includes an over voltage protection circuit, including an over voltage detection circuit configured to detect an over voltage condition on the external power source and a clamp circuit configured to clamp the external power source when the over voltage detection circuit detects the over voltage condition on the external power source.

In Example 2, Example 1 optionally includes a host power source detection circuit configured to validate the host power source and to provide the indication of host power source validity and an external power source detection circuit configured to validate the external power source and to provide the indication of external power source validity.

In Example 3, the clamp circuit of any one or more of Examples 1-2 optionally includes a clamp switch configured to selectively short the clamp circuit [for] *after* an initial time period when the indication of external power source validity indicates a valid external power source.

In Example 4, any one or more of Examples 1-3 optionally includes a bandgap reference circuit configured to provide a bandgap voltage reference, wherein the host power source detection circuit of any one or more of Examples 1-3 optionally includes a comparator configured to validate the host power source using the value of the host power source and the bandgap voltage reference, and wherein the external power source detection circuit of any one or more of Examples 1-3 optionally includes a comparator configured to validate the external power source using the value of the external power source and the bandgap voltage reference.

In Example 5, any one or more of Examples 1-4 optionally includes a voltage regulator configured to provide a regulated external power source, wherein the switch any one or more of Examples 1-4 is optionally configured to provide the internal supply rail using the regulated external power source when the indication of host power source validity indicates an invalid host power source and the indication of external power source validity indicates a valid external power source.

In Example 6, the switch of any one or more of Examples 1-5 optionally includes a first input configured to receive the host power source, a second input configured to receive the external power source, a first control input configured to receive the indication of the host power source validity, a second control input configured to receive the indication of the external power source validity, and an output configured to provide an internal supply rail.

In Example 7, the clamp circuit any one or more of Examples 1-6 optionally includes a clamp switch configured to selectively short the clamp circuit when the over voltage detection circuit does not detect the over voltage condition on the external power source.

In Example 8, the clamp switch of any one or more of Examples 1-7 optionally includes a transistor, wherein the clamp circuit of any one or more of Examples 1-7 optionally includes a clamp control circuit including an oscillator, a counter, and a charge pump, and wherein the clamp control circuit is configured to receive an indication of a detected over voltage condition and to control the clamp switch using the indication of over voltage detection circuit detects the over voltage condition on the external power source.

In Example 9, a power management method includes receiving indications of host and external power source validities, providing an internal supply rail using a host power source when the indication of host power source validity indicates a valid host power source, providing an internal supply rail using an external power source when the indication of host power source validity indicates an invalid host power source and the indication of external power source validity indicates a valid external power source, detecting an over voltage condition on the external power source, and clamping the external power source using a clamp circuit when the over voltage condition is detected on the external power source.

In Example 10, any one or more of Examples 1-9 optionally includes validating the host power source and providing the indication of host power source validity and validating the external power source and providing the indication of external power source validity.

In Example 11, any one or more of Examples 1-10 optionally includes selectively shorting the clamp circuit [for] *after* an initial time period when the indication of external power source validity indicates a valid external power source.

In Example 12, any one or more of Examples 1-11 optionally includes providing a bandgap voltage reference, validating the host power source using the value of the host power source and the bandgap voltage reference, and validating the external power source using the value of the external power source and the bandgap voltage reference.

In Example 13, any one or more of Examples 1-12 optionally includes providing a regulated external power source, wherein the providing the internal supply rail of any one or more of Examples 1-12 optionally includes using the regulated external power source when the indication of host power source validity indicates an invalid host power source and the indication of external power source validity indicates a valid external power source.

In Example 14, any one or more of Examples 1-13 optionally includes selectively shorting a clamp circuit when the over voltage detection circuit does not detect an over voltage condition on the external power source.

In Example 15, any one or more of Examples 1-14 optionally includes receiving an indication of a detected over voltage condition on the external power source and controlling the clamp circuit using the indication of over voltage detection detects the over voltage condition on the external power source.

In Example 16, a power management system includes an electronic device, including a host power source and a universal serial bus (USB) port, the USB port configured to receive an external power source, a switch configured to receive the host power source, the external power source, an indication of host power source validity, and an indication of external power source validity, wherein the switch is configured to provide an internal supply rail using (1) the host power source when the indication of host power source validity indicates a valid host power source, and (2) the external power source when the indication of host power source validity indicates an invalid host power source and the indication of external power source validity indicates a valid external power source, an over voltage protection circuit, including an over voltage detection circuit configured to detect an over voltage condition on the external power source, and a clamp circuit configured to clamp the external power source when the over voltage detection circuit detects the over voltage condition on the external power source.

In Example 17, any one or more of Examples 1-16 optionally includes a host power source detection circuit configured to validate the host power source and to provide the indication of host power source validity and an external power source detection circuit configured to validate the external power source and to provide the indication of external power source validity.

In Example 18, the clamp circuit of any one or more of Examples 1-[317] *17* optionally includes a clamp switch configured to selectively short the clamp circuit [for] *after* an initial time period when the indication of external power source validity indicates a valid external power source.

In Example 19, any one or more of Examples 1-18 optionally includes a bandgap reference circuit configured to provide a bandgap voltage reference, wherein the host power source detection circuit includes a comparator configured to validate the host power source using the value of the host power source and the bandgap voltage reference, and wherein the external power source detection circuit includes a comparator configured to validate the external power source using the value of the external power source and the bandgap voltage reference.

In Example 20, the clamp circuit of any one or more of Examples 1-19 optionally includes a clamp switch configured to selectively short the clamp circuit when the over voltage detection circuit does not detect the over voltage condition on the external power source.

In Example 21, a system or apparatus can include, or can optionally be combined with any portion or combination of any portions of any one or more of Examples 1-20 to include, means for performing any one or more of the functions of Examples 1-20 or a machine-readable medium including instructions that, when performed by a machine, cause the machine to perform any one or more of the functions of Examples 1-20.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive, For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A power management circuit, comprising:

a switch configured to receive *a voltage from* a host power source, *a voltage from* an external power source, an indication of host power source validity, and an indication of external power source validity;

wherein the switch is configured to provide *a voltage to* an internal supply rail using (1) the host power source when the indication of host power source validity indicates a valid host power source, and (2) the external power source when the indication of host power source validity indicates an invalid host power source and the indication of external power source validity indicates a valid external power source; and an over voltage protection circuit, including:

an over voltage detection circuit configured to detect an over voltage condition on the external power source; and a clamp circuit configured to (*1*) *clamp the external power source for an initial time period when the indication of external power source validity indicates a valid external power source, and* (*2*) clamp the external power source when the over voltage detection circuit detects the over voltage condition on the external power source.

2. The power management circuit of claim 1, including:

a host power source detection circuit configured to validate the host power source and to provide the indication of host power source validity; and an external power source detection circuit configured to validate the external power source and to provide the indication of external power source validity;

wherein the host power source includes a battery, and wherein the external power source includes an external bus voltage.

3. The power management circuit of claim 2, wherein the clamp circuit includes a clamp switch configured to selectively short the clamp circuit [for an] *after the* initial time period when the indication of external power source validity indicates a valid external power source *and the over voltage detection circuit detects that no over voltage condition exists on the external power source*.

4. The power management circuit of claim 2, including a bandgap reference circuit configured to provide a bandgap voltage reference;

wherein the host power source detection circuit includes a comparator configured to validate the host power source using the [value] *voltage* of the host power source and the bandgap voltage reference; and wherein the external power source detection circuit includes a comparator configured to validate the external power source using the [value] *voltage* of the external power source and the bandgap voltage reference.

5. The power management circuit of claim 1, including a voltage regulator configured to provide a regulated external power source; and wherein the switch is configured to provide *the voltage to* the internal supply rail using the regulated external power source when the indication of host power source validity indicates an invalid host power source and the indication of external power source validity indicates a valid external power source.

6. The power management circuit of claim 1, wherein the switch includes:

a first input configured to receive *the voltage from* the host power source;

a second input configured to receive *the voltage from* the external power source;

a first control input configured to receive the indication of the host power source validity;

a second control input configured to receive the indication of the external power source validity; and an output configured to provide [an] *the voltage to the* internal supply rail.

7. The power management circuit of claim 1, wherein the clamp circuit includes a clamp switch configured to selectively short the clamp circuit when the over voltage detection circuit does not detect the over voltage condition on the external power source.

8. The power management circuit of claim 7, wherein the clamp switch includes a transistor;

wherein the clamp circuit includes a clamp control circuit including an oscillator, a counter, and a charge pump; and wherein the clamp control circuit is configured to receive an indication of a detected over voltage condition *on the external power source* and to control the clamp switch using the indication of [over voltage detection circuit detects the] *detected* over voltage condition on the external power source.

9. A power management method, comprising:

receiving indications of host and external power source validities;

providing *a voltage to* an internal supply rail using a host power source when the indication of host power source validity indicates a valid host power source;

providing [an] *a voltage to the* internal supply rail using an external power source when the indication of host power source validity indicates an invalid host power source and the indication of external power source validity indicates a valid external power source;

detecting an over voltage condition on the external power source; [and]

clamping the external power source using a clamp circuit when the over voltage condition is detected on the external power source*; and*

*clamping the external power source for an initial time period using the clamp circuit when the indication of external power source validity indicates a valid external power source.*

10. The method of claim 9, including:

validating the host power source and providing the indication of host power source validity; and validating the external power source and providing the indication of external power source validity.

11. The method of claim 10, including selectively shorting the clamp circuit [for an] *after the* initial time period when the indication of external power source validity indicates a valid external power source *and no over voltage condition exists on the external power source*.

12. The method of claim 10, including:

providing a bandgap voltage reference;

validating the host power source using the [value] *voltage* of the host power source and the bandgap voltage reference; and validating the external power source using the [value] *voltage* of the external power source and the bandgap voltage reference.

13. The method of claim 9, including providing a regulated external power source; and wherein the *step of* providing *the voltage to* the internal supply rail *using the external power source* includes using the regulated external power source when the indication of host power source validity indicates an invalid host power source and the indication of external power source validity indicates a valid external power source.

14. The method of claim 9, including selectively shorting [a] *the* clamp circuit when [the over voltage detection circuit does not detect an] *no* over voltage condition *exists* on the external power source.

15. The method of claim 14, including:

receiving an indication of a detected over voltage condition on the external power source; and controlling the clamp circuit using the indication of [over voltage detection detects the] *detected* over voltage condition on the external power source.

16. A power management system, comprising:

an electronic device, including a host power source and a universal serial bus (USB) port, the USB port configured to receive *a voltage from* an external power source;

a switch configured to receive *a voltage from* the host power source, *the voltage from* the external power source, an indication of host power source validity, and an indication of external power source validity;

wherein the switch is configured to provide *a voltage to* an internal supply rail using (1) the host power source when the indication of host power source validity indicates a valid host power source, and (2) the external power source when the indication of host power source validity indicates an invalid host power source and the indication of external power source validity indicates a valid external power source; *and* an over voltage protection circuit, including:

an over voltage detection circuit configured to detect an over voltage condition on the external power source; and a clamp circuit configured to (*1*) *clamp the external power source for an initial time period when the indication of external power source validity indicates a valid external power source, and* (*2*) clamp the external power source when the over voltage detection circuit detects the over voltage condition on the external power source.

17. The power management system of claim 16, including:

a host power source detection circuit configured to validate the host power source and to provide the indication of host power source validity; and an external power source detection circuit configured to validate the external power source and to provide the indication of external power source validity.

18. The power management system of claim 17, wherein the clamp circuit includes a clamp switch configured to selectively short the clamp circuit [for an] *after the* initial time period when the indication of external power source validity indicates a valid external power source *and the over voltage detection circuit detects that no over voltage condition on the external power source exists*.

19. The power management system of claim 17, including a bandgap reference circuit configured to provide a bandgap voltage reference;

wherein the host power source detection circuit includes a comparator configured to validate the host power source using the [value] *voltage* of the host power source and the bandgap voltage reference; and wherein the external power source detection circuit includes a comparator configured to validate the external power source using the [value] *voltage* of the external power source and the bandgap voltage reference.

20. The power management [circuit] *system* of claim 16, wherein the clamp circuit includes a clamp switch configured to selectively short the clamp circuit when the over voltage detection circuit does not detect the over voltage condition on the external power source.

* * * * *